Oct. 31, 1961     I. J. VOGELFANGER     3,006,344
SURGICAL LIGATOR AND CUTTER
Filed Feb. 24, 1959     3 Sheets-Sheet 1
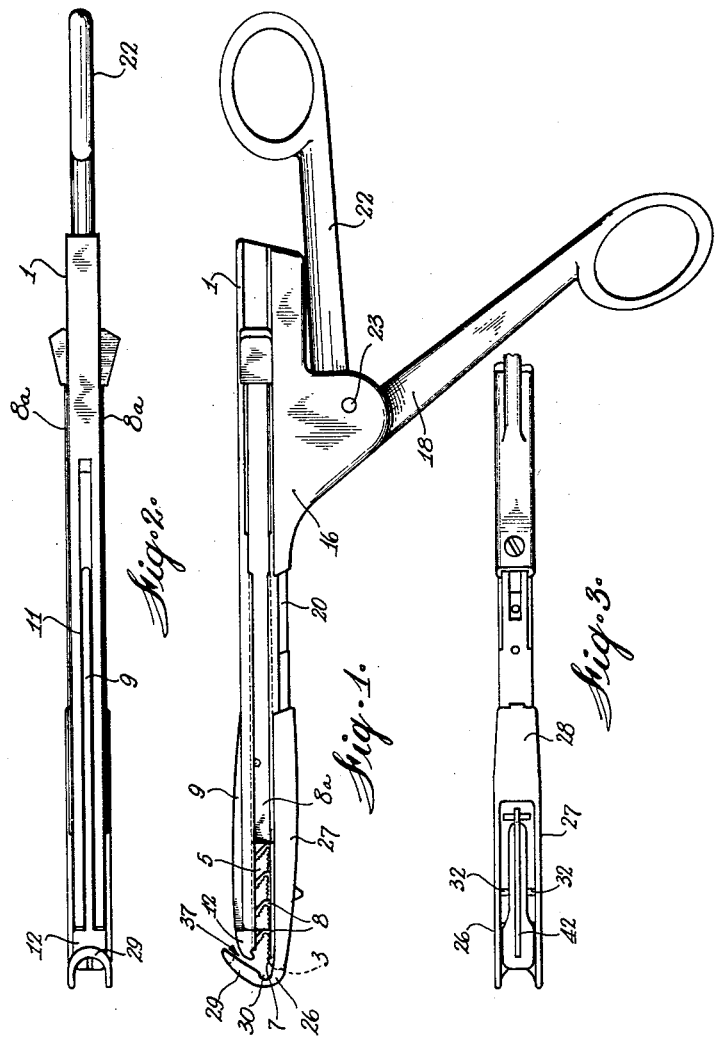

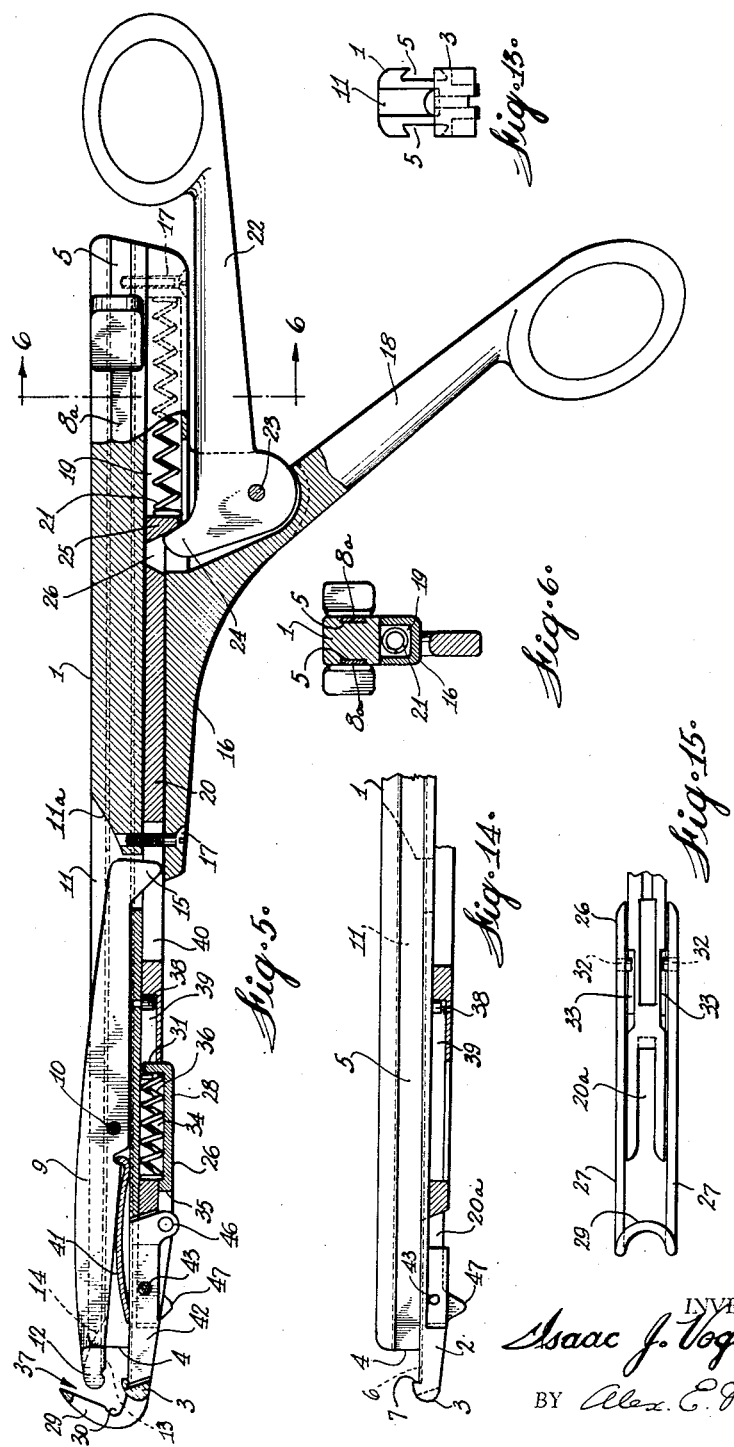

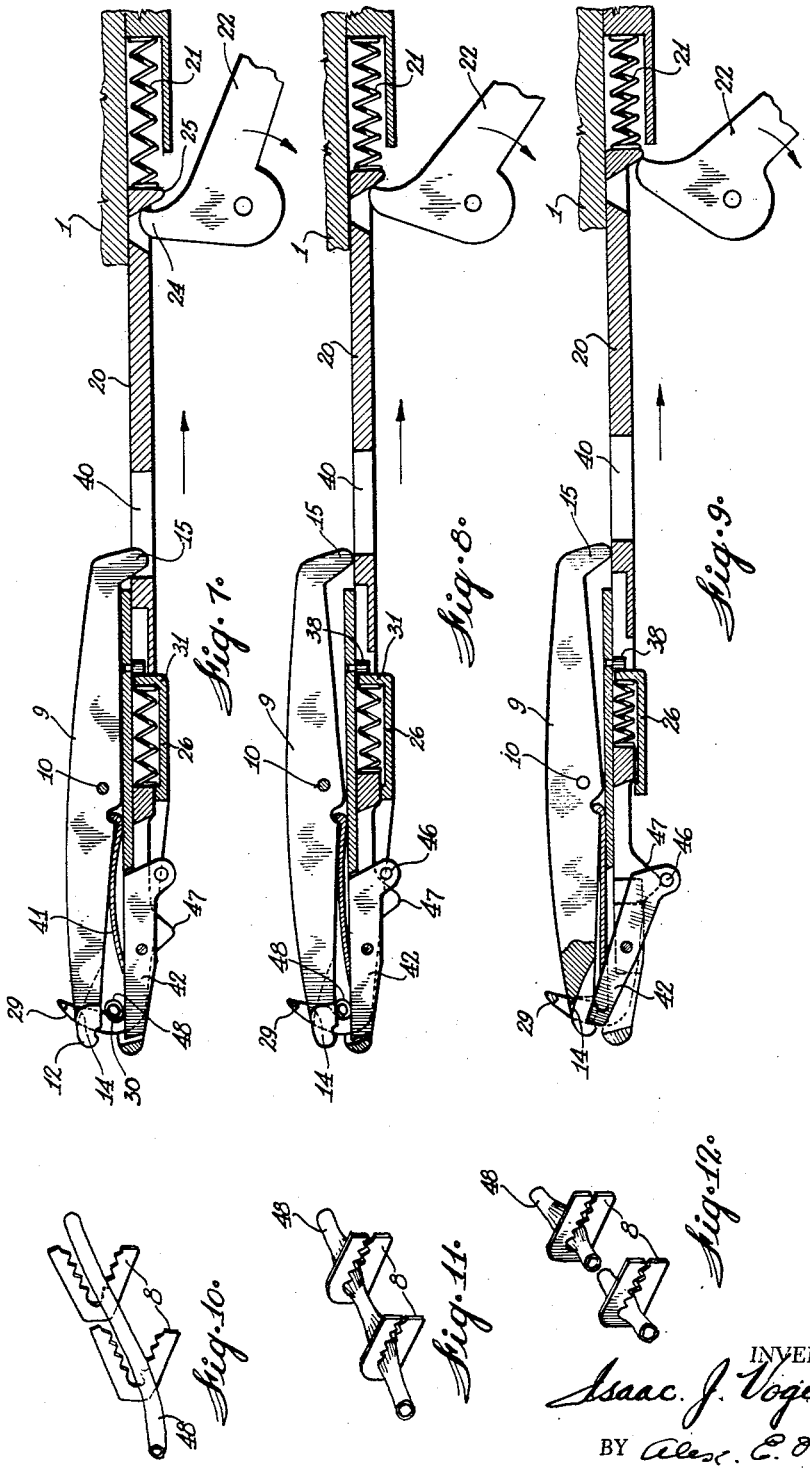

United States Patent Office 3,006,344
Patented Oct. 31, 1961

3,006,344
SURGICAL LIGATOR AND CUTTER
Isaac J. Vogelfanger, 86 Irving Place,
Ottawa, Ontario, Canada
Filed Feb. 24, 1959, Ser. No. 794,914
8 Claims. (Cl. 128—318)

This invention relates to surgical instruments and more particularly to a surgical ligator and cutter for use in facilitating hemostasis.

In general and specialized surgery, in order to produce an approach to a diseased area in any of the cavities or extremities of the human body, vessels supplying living tissues must be divided. Before such division, a pair of clamps must be applied to the vessel to prevent bleeding, and the vessel severed between the clamps and then ligated at the clamped areas. This part of surgical technique involving the arrest of bleeding and termed hemostasis is of dominating significance in surgical operations.

Hemostasis (when applied to larger vessels of 1 mm. and up in diameter) is preferably preventive in nature, that is, a vessel should be first exposed and ligated before it is cut. The severing of clamped vessels for subsequent tieing is also a major part of resectional surgery, that is, surgery involving the removal of useless or potentially dangerously diseased organs or parts of the body.

It will be apparent that the safer the manner in which hemostasis is performed the less possibility there is of postoperative complications resulting from bleeding and infection. The faster the hemostasis, the shorter is the operating time (in some surgical procedures hemostasis alone consumes more than 50% of the total operating time), with resulting smoother post-operative recovery.

In general, preventive hemostasis comprises the following seven surgical manoeuvres:
 (1) Clamping the vessel on one side.
 (2) Clamping the vessel on the other side.
 (3) Severing the vessel between the clamps.
 (4) Ligation o fthe clamped vessel on one side.
 (5) Ligation of the clamped vessel on the other side.
 (6) Cutting the suture material above one knot.
 (7) Cutting the ligature material above the other knot.

These seven surgical manoeuvres are time consuming and, depending upon the accessibility and depth of the operating field, may last from one up to ten minutes in the hands of even the best surgeon.

It is an object of this invention to provide a surgical ligator and cutter of simple, compact construction, which may be employed to effect hemostasis procedures in greatly reduced time, which is simple and convenient to operate whereby hemostasis may be performed even in the most difficult areas by surgeons of average capability and which effects hemostasis in a fully positive and satisfactory manner.

The invention resides in a surgical ligator and cutter comprising an elongated body member having a forward end, a rearward end, and a fixed jaw adjacent said forward end, said jaw having a pair of laterally aligned spaced clip-receiving sections, an arm pivotlly mounted intermediate its ends in said body member, said arm having a movable jaw adjacent one end thereof, said movable jaw having a pair of laterally aligned spaced clip-engaging sections each overlying one of said clip-receiving sections, a cutter pivotally mounted in said body member and having a path of movement located between said clip-receiving and clip-engaging sections and intersecting the plane of each said clip-receiving sections and said clip-engaging sections, a bar slidably mounted in said body member, cam means for rocking said arm in response to an initial degree of reciprocal movement of said bar to move said movable jaw towards said fixed jaw, and cam means for rocking said cutter in response to a subsequent degree of reciprocal movement of said bar to move said cutter in said path.

The invention will be described with reference to the accompanying drawings, in which:
 FIGURE 1 is a side elevation of an instrument in accordance with the invention,
 FIGURE 2 is a top plan view of the instrument,
 FIGURE 3 is a partial bottom plan view of the instrument,
 FIGURE 4 is a perspective view of a clip in accordance with the invention,
 FIGURE 5 is an enlarged side elevation, partly in section, of the instrument,
 FIGURE 6 is a transverse section on line 6—6 of FIGURE 5,
 FIGURES 7, 8 and 9 are partial side elevations, partly in section, of operational positions of parts of the instrument,
 FIGURES 10, 11 and 12 are perspective views of the operational positions of the clips,
 FIGURE 13 is an end elevation of the instrument,
 FIGURE 14 is a side elevation of the forward portion of the body member, with parts removed, and
 FIGURE 15 is a plan view of the sliding bar and hook member.

The instrument illustrated in the drawings comprises an elongated body member 1 which, as shown, is a generally rectangular metallic bar. At one end of the body 1 is a depending portion 2 which has a section 3 projecting forwardly of the major end surface 4 of the body. The body member 1 is longitudinally slotted at 11, such slot extending from a point intermediate the ends thereof and through depending portion 2 and section 3 where it terminates in an inclined surface 11a.

Any suitable pair of clip-carrying means or magazines are carried by the body and, in the form shown, comprises a groove 5 in each side surface of the body. The projecting end section 3 has a pair of grooves 6 each forming a continuation of the lower portion of a groove 5. A row of clips 8 are arranged to be carried in each groove 5, such rows being in parallel spaced relation as shown. Each groove 6 terminates in a shoulder 7 which constitutes a stop for the end clip 8 of a row of clips. It will be apparent that the two end clips of the rows are seated in grooves 6 upon the end section 3 and in engagement with shoulders 7, such end clips being thus in position for actuation by the instrument. The section 3 constitutes a fixed jaw of the instrument. A slide 8a may be provided in each groove 5 to constitute means for advancing each row of clips. It will be apparent that any conventional spring-urged advancing means may be employed for this purpose.

An arm 9 is pivotally mounted intermediate its ends on a pin 10 in body 1, such arm being received within the slot 11. Arm 9 has an enlarged end portion 12, constituting a movable jaw and overlying fixed jaw 3. Jaw 12 has a pair of grooves 13 therein constituting continuations of the upper portions of grooves 5 and thus being in complementary relation to grooves 6 in the fixed jaw 3. A cutter receiving slot 14 extends longitudinally through jaw 12 and the adjoining portion of the arm. A depending cam 15 is formed at the other end of arm 9.

For purposes of description and reference, the end of the instrument in which the jaws 3 and 12 are disposed will be referred to as the forward end and the opposite end as the rearward end.

Means for supporting body 1 and associated elements comprises a frame 16 secured to the rearward portion of the body as by screws 17 and having a depending handle 18.

Frame 16 has a longitudinal recess 19 therein in which is reciprocally mounted a bar 20. A spring 21 in recess 19 interposed between the end of bar 20 and the end wall of the recess urges the bar in a forward direction. Means for imparting reciprocating movement to the bar in a rearward direction against the action of the spring 21 comprises a handle 22 pivoted at 23 to the frame 16 and having a cam 24 in engagement with a depending cam 25 on the rearward end of bar 20. Bar 20 has an opening 26 adjacent the cam 25 to accommodate movement of cam 24. Furthermore, the forward portion of bar 20 is slotted at 20a to fit about depending portion 2 of the body member 1.

It will be apparent that handles 18 and 22 constitute a scissorslike grip for users of the instrument, handle 22 being adapted to receive the thumb of the user. It will also be apparent that, by pressing handle 22 towards handle 18, bar 20 will be moved in a rearward direction and on release of pressure on handle 22, bar 20 will move forwardly under the influence of spring 21.

A vessel locating hook member 26 is mounted on the forward portion of bar 20 for limited reciprocal movement with respect thereto. The member 26 has a pair of side walls 27 joined together at their rearward portions by a web 28 and terminating forwardly in a hook 29 which is constituted by a loop connecting the ends of the side walls 27. Aligned recesses 30 are formed in the legs of the loop adjacent the base thereof. A lug 31 projects upwardly from rearward end of web 28 between walls 27. Member 26 is reciprocally mounted on bar 20 by means of a pair of aligned pins 32 projecting inwardly from walls 27 above the web 28 and slidably engaging the walls of grooves 33 in bar 20.

As clearly shown in FIGURE 5, web 28 of hook member 26 is located below the outer surface of bar 20 which has an opening 34 to receive the lug 31. Opening 34 is elongated to permit reciprocal movement of the lug therein. The inner edge portion 35 of the web bears upon the outer surface of bar 20, as shown. A spring 36 has one end bearing on the forward wall of opening 34 and its other end bearing on lug 31 to normally position the hook member 26 with lug 31 in engagement with the rearward wall of opening 34.

It will be observed that the hook 29 is normally disposed slightly forwardly of the jaws 3 and 12. Moreover, the end portion of the hook projects above moveable jaw 12 and is directed towards such jaw to provide an inclined vessel receiving passage 37.

Means for limiting the reciprocal movement of hook member 26 in relation to sliding bar 20 comprises a stop 38 mounted on body member 1 and projecting into a groove 39 in bar 20. Groove 39 extends from the rearward wall of opening 34 whereby a predetermined extent of reciprocal movement of bar 20 will place stop 38 in engagement with lug 31 of member 26.

Means for rocking arm 9 in response to reciprocal movement of bar 20 in a rearward direction to move jaw 12 towards jaw 3 for compression therebetween of a pair of clips comprises the provision of a slot 40 in bar 20 and into which the cam 15 of arm 9 projects in the open position of jaw 12. A spring 41 mounted on body member 1 urges arm 9 into jaw-opening position. It will be apparent that, on engagement of the forward wall of slot 40 with the cam surface of cam 15, the rearward portion of arm 9 will be moved upward to swing the forward portion (with jaw 12) downwardly.

A cutter 42 is pivotally mounted intermediate its ends by means of pins 43 in the portion 2 of body member 1, such cutter being received in the portion of slot 11 directly below the forward section of arm 9. The forward end portion of cutter 42 is adapted to be swung upwardly to perform a cutting operation following the jaw closing movement of jaw 12. It will be apparent that the forward portion of cutter 42 may swing upwardly through slot 20a of bar 20 as well as through aligned slot 14 in arm 9 as shown in FIGURE 9. The edges of the walls of slot 14 are preferably sharpened to constitute an element of the cutting means in cooperation with the swinging cutter 42. Means for swinging the forward portion of cutter 42 upwardly comprises a pin 46 extending laterally from each side of the cutter, and a depending cam projection 47 carried by bar 20 on each side of slot 20a.

In operation, with the instrument in its normal at rest position as shown, for instance in FIGURE 5, it is grasped with a "scissors" grip by the surgeon, as previously indicated. The hook 29 is applied to the portion 48 of the vessel which is to be ligated and severed. It will be observed that the instrument may readily be manipulated to move the forward end of the instrument for reception of the vessel through passage 37. Obviously, the instrument may be of any desired length to facilitate positioning of the forward end of the instrument in various body cavities. With the vessel portion located at the base of the hook 29, handle 22 is pressed towards handle 18. The initial part of such movement moves bar 20 rearwardly with cam 15 traversing slot 40 and arm 9 remaining stationary. However, such initial movement moves hook member 26 and hook 29 rearwardly to the position shown in FIGURE 7. Such movement thus locates the vessel between jaws 3 and 12 and, therefore, between the pair of open clips 8 in the jaws, the relation of vessel and clips being shown in FIGURE 10.

As the bar 20 reciprocates rearwardly, the second phase of its movement causes cam 15 to engage the end wall of slot 40 and move out of the slot as shown in FIGURE 8. This in turn causes the forward end of arm 9 with jaw 12 to move downwardly and thus compress the pair of clips against fixed jaw 3. Thus, the clips are effectively closed about the vessel to seal the latter at two spaced points, as indicated in FIGURE 11.

As the bar 20 continues to reciprocate rearwardly, the third phase of its movement causes cams 47 to engage pins 46 to swing the forward portion of cutter 42 upwardly between the clips and thus sever the vessel therebetween, as shown in FIGURES 9 and 12.

On release of handle 22, the bar will move forwardly under the influence of spring 21 and the other moving parts will return to normal position under the influence of springs 36 and 41. The instrument may then be removed from the body cavity and, on positioning of another pair of clips in jaw 3, is ready for a subsequent operation.

FIGURE 4 illustrates a preferred form of clip 8. As shown, the clip is formed of flat metal or like stock. It is composed of a material which is completely inert to body conditions, such as tantalum. It has a leg 49 having a flat outer edge 50 for engagement with the grooves 5 and 6. It also has a leg 51 extending angularly with respect to leg 49 from the connecting portion 52. The inner edges 53 and 54 of the clip are serrated as shown, such serrations being interfitted in the closed position of the clip (shown in FIGURE 12) for effective sealing. The connecting portion 52 may be interiorly recessed at 55 to permit close interfitting of the serrations.

The instrument described may be utilized to perform hemostasis in a minimum amount of time. It will be apparent that the forward end of the instrument may be quickly and conveniently "hooked" about the portion of the vessel and that, having located such portion in the instrument, there is no danger of relative movement of the vessel and instrument since the hook member 26 effectively and positively locates the vessel with respect to the instrument. The time required to effect one rearward stroke of the bar 20 to carry out the fixed sequence of operations described is about one second.

As previously indicated, the instrument described performs its operation in a succession or fixed sequence of steps consisting of (1) positive location of the instrument with respect to the vessel, (2) application of the pair of clips and (3) severing of the vessel. Performance of such steps in succession, rather than simultaneously, constitutes an important safety factor in the use of the instrument. If two or more of these steps were adapted to be performed simultaneously by an instrument, there would exist the possibility of slight deviations from the simultaneous operation with very dangerous results. Thus, the vessel may be cut prematurely before the clips are safely applied and the cut ends of the vessel may retract and slip out of clip-applying position. Such an accident may result in serious bleeding.

It will be apparent that the instrument described may be readily varied in design to meet desired conditions of use. It may be formed of any suitable metal or other material.

I claim:

1. A surgical ligator and cutter comprising an elongated body member having a forward end, a rearward end, and a fixed jaw adjacent said forward end, said jaw being a pair of laterally aligned spaced clip-receiving sections, an arm pivotally mounted intermediate its ends in said body member, said arm having a movable jaw adjacent one end thereof, said movable jaw having a pair of laterally aligned spaced clip-engaging sections each overlying one of said clip-receiving sections, a cutter pivotally mounted in said body member and having a path of movement located between said clip-receiving and clip-engaging sections and intersecting the plane of each said clip-receiving sections and said clip-engaging sections, a bar slidably mounted in said body member, cam means for rocking said arm in response to an initial degree of reciprocal movement of said bar to move said movable jaw towards said fixed jaw, and cam means for rocking said cutter in response to a subsequent degree of reciprocal movement of said bar to move said cutter in said path.

2. A surgical ligator and cutter comprising an elongated body member having a forward end, a rearward end, and a fixed jaw adjacent said forward end, said jaw having a pair of laterally aligned spaced clip-receiving sections, an arm pivotally mounted intermediate its ends in said body member, said arm having a movable jaw adjacent one end thereof, said movable jaw having a pair of laterally aligned spaced clip-engaging sections each overlying one of said clip-receiving sections, a cutter pivotally mounted in said body member and having a path of movement located between said clip-receiving and clip-engaging sections and intersecting the plane of each said clip-receiving sections and said clip-engaging sections, a bar slidably mounted in said body member, a vessel-positioning hook member reciprocally mounted in said bar and having a hook normally disposed forwardly of said jaws, means for reciprocating said bar in a rearward direction, said hook member being movable with said bar during the initial degree of rearward reciprocation thereof to a vessel-holding position between said clip-receiving and clip-engaging sections, cam means for rocking said arm in response to a second degree of rearward reciprocation of said bar to move said movable jaw towards said fixed jaw, and cam means for rocking said cutter in response to a third degree of rearward reciprocation of said bar to move said cutter in said path.

3. A surgical ligator and cutter as defined in claim 2, said bar reciprocating means comprising a handle fixed to said body member, a handle pivotally mounted on said body member, and cam means carried by said pivotally mounted handle and engaging said bar to reciprocate said bar in response to swinging movement of said pivotally mounted handle.

4. A surgical ligator and cutter as defined in claim 2, said bar reciprocating means comprising a handle fixed to said body member, a handle pivotally mounted on said body member, said pivotally mounted handle having a portion engaging said bar to impart rearward reciprocation thereto in response to swinging movement of said pivotally mounted handle, and a spring urging said bar in a forward direction.

5. A surgical ligator and cutter as defined in claim 2, said body member having a stop engageable by said hook member to define said vessel-holding position thereof.

6. A surgical ligator and cutter as defined in claim 2, said arm-rocking cam means comprising a cam depending from said arm, said bar having a slot receiving said cam.

7. A surgical ligator and cutter as defined in claim 2, said cutter-rocking cam means comprising a cam carrier by said bar, and a cam engageable portion carried by said cutter.

8. A surgical ligator and cutter comprising an elongated body member having a forward end, a rearward end, and a fixed jaw adjacent said forward end, said jaw having a pair of laterally aligned spaced clip-receiving sections, an arm pivotally mounted intermediate its ends in said body member, said arm having a movable jaw adjacent one end thereof, said movable jaw having a pair of laterally aligned spaced clip-engaging sections each overlying one of said clip-receiving sections, a cutter pivotally mounted in said body member and having a path of movement located between said clip-receiving and clip-engaging sections and intersecting the plane of each said clip-receiving sections and said clip-engaging sections, a manually operable cam actuating member mounted in said body member, cam means for rocking said arm in response to an initial degree of movement of said cam actuating member to move said movable jaw towards said fixed jaw, and cam means for rocking said cutter in response to a subsequent degree of movement of said cam actuating member to move said cutter in said path.

References Cited in the file of this patent

UNITED STATES PATENTS

| | | |
|---|---|---|
| 352,245 | Hullhorst | Nov. 9, 1886 |
| 773,317 | Funke | Oct. 25, 1904 |
| 1,563,779 | Nordin | Dec. 1, 1925 |
| 2,060,724 | Carroll | Nov. 10, 1936 |
| 2,384,697 | Riccardi | Sept. 11, 1945 |